United States Patent
Healy et al.

(10) Patent No.: US 9,210,450 B2
(45) Date of Patent: Dec. 8, 2015

(54) SHARED CONTENT STORAGE

(75) Inventors: Chris Healy, Orange, CA (US); Randall Bird, Newport Beach, CA (US); Kevin Cote, Yorba Linda, CA (US); Rodney Farley, Yorba Linda, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 196 days.

(21) Appl. No.: 13/313,879

(22) Filed: Dec. 7, 2011

(65) Prior Publication Data

US 2012/0167148 A1 Jun. 28, 2012

Related U.S. Application Data

(60) Provisional application No. 61/427,764, filed on Dec. 28, 2010.

(51) Int. Cl.
| | | |
|---|---|---|
| *H04N 21/214* | (2011.01) | |
| *H04N 21/231* | (2011.01) | |
| *H04N 21/63* | (2011.01) | |
| *H04N 21/845* | (2011.01) | |

(52) U.S. Cl.
CPC ..... *H04N 21/2146* (2013.01); *H04N 21/23106* (2013.01); *H04N 21/632* (2013.01); *H04N 21/8456* (2013.01)

(58) Field of Classification Search
USPC .............. 725/82, 74, 76; 701/1; 719/328; 709/248; 707/999.202; 715/201
See application file for complete search history.

(56) References Cited

U.S. PATENT DOCUMENTS

| | | | | |
|---|---|---|---|---|
| 5,208,665 | A | * | 5/1993 | McCalley et al. .............. 725/119 |
| 5,404,567 | A | * | 4/1995 | DePietro et al. .............. 455/3.06 |
| 5,973,722 | A | | 10/1999 | Wakai et al. |
| 6,061,720 | A | | 5/2000 | Kamel et al. |
| 6,177,887 | B1 | * | 1/2001 | Jerome ............................. 725/76 |
| 6,192,416 | B1 | * | 2/2001 | Baxter ........................... 709/248 |
| 7,103,324 | B2 | | 9/2006 | Sanford et al. |
| 7,257,309 | B1 | | 8/2007 | Elswick et al. |
| 7,404,201 | B2 | * | 7/2008 | Takeuchi et al. .............. 725/109 |
| 7,620,364 | B2 | | 11/2009 | Higashida et al. |
| 8,283,801 | B2 | | 10/2012 | Petipierre |
| 2005/0256616 | A1 | * | 11/2005 | Rhoads ............................. 701/1 |
| 2006/0008256 | A1 | | 1/2006 | Khedouri et al. |
| 2006/0271970 | A1 | * | 11/2006 | Mitchell et al. .................. 725/82 |
| 2008/0065975 | A1 | * | 3/2008 | Massoulie et al. ............ 715/201 |
| 2008/0270583 | A1 | | 10/2008 | Gonzales et al. |
| 2010/0138879 | A1 | * | 6/2010 | Bird et al. ........................ 725/76 |
| 2010/0162325 | A1 | | 6/2010 | Bonar |
| 2010/0250867 | A1 | | 9/2010 | Bettger et al. |
| 2010/0251010 | A1 | | 9/2010 | Peters et al. |
| 2010/0257374 | A1 | | 10/2010 | Kuehn et al. |
| 2010/0312828 | A1 | | 12/2010 | Besserglick et al. |
| 2011/0219409 | A1 | * | 9/2011 | Frisco et al. ..................... 725/77 |

FOREIGN PATENT DOCUMENTS

KR   10-0717059   5/2007

\* cited by examiner

*Primary Examiner* — Hunter B Lonsberry
*Assistant Examiner* — Tariq Gbond
(74) *Attorney, Agent, or Firm* — Fish & Tsang LLP

(57) ABSTRACT

Entertainment systems for aircraft and other vehicles are described having a plurality of media players. The media players collectively store a full content set, with each media player storing only a fraction of the full content set. Each of the media players can be configured to index the full content set, such that media players can obtain missing content from other media players.

18 Claims, 4 Drawing Sheets

SHARED CONTENT STORAGE

This application claims the benefit of priority to U.S. provisional application having Ser. No. 61/427,764 filed on Dec. 28, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is content distribution, especially as it relates to vehicular entertainment systems.

BACKGROUND

Known seat-centric In-Flight Entertainment (IFE) systems replace the entertainment content which is stored in head-end servers with a full content set at each seat as discussed in co-owned U.S. patent application having Ser. No. 12/629,695 filed Dec. 2, 2009. Although such an approach provides redundancy in the event of a head-end server failure, the approach requires a significant amount of storage.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Thus, there is still a need for more cost-effective, seat-centric content distribution systems.

SUMMARY OF THE INVENTION

The inventive subject matter provides apparatus, systems and methods for IFE systems and other vehicular entertainment systems, which include a plurality of media players disposed within a vehicle. The plurality of media players collectively store one or more copies of a full content set, which is preferably separated into fractions of the full content set and the fractions, possibly overlapping fractions, can be spread over a set of the media players.

Each of the media players is preferably configured to index the full content set to allow each media player obtain missing content from other player(s) of the plurality of media players over a network.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
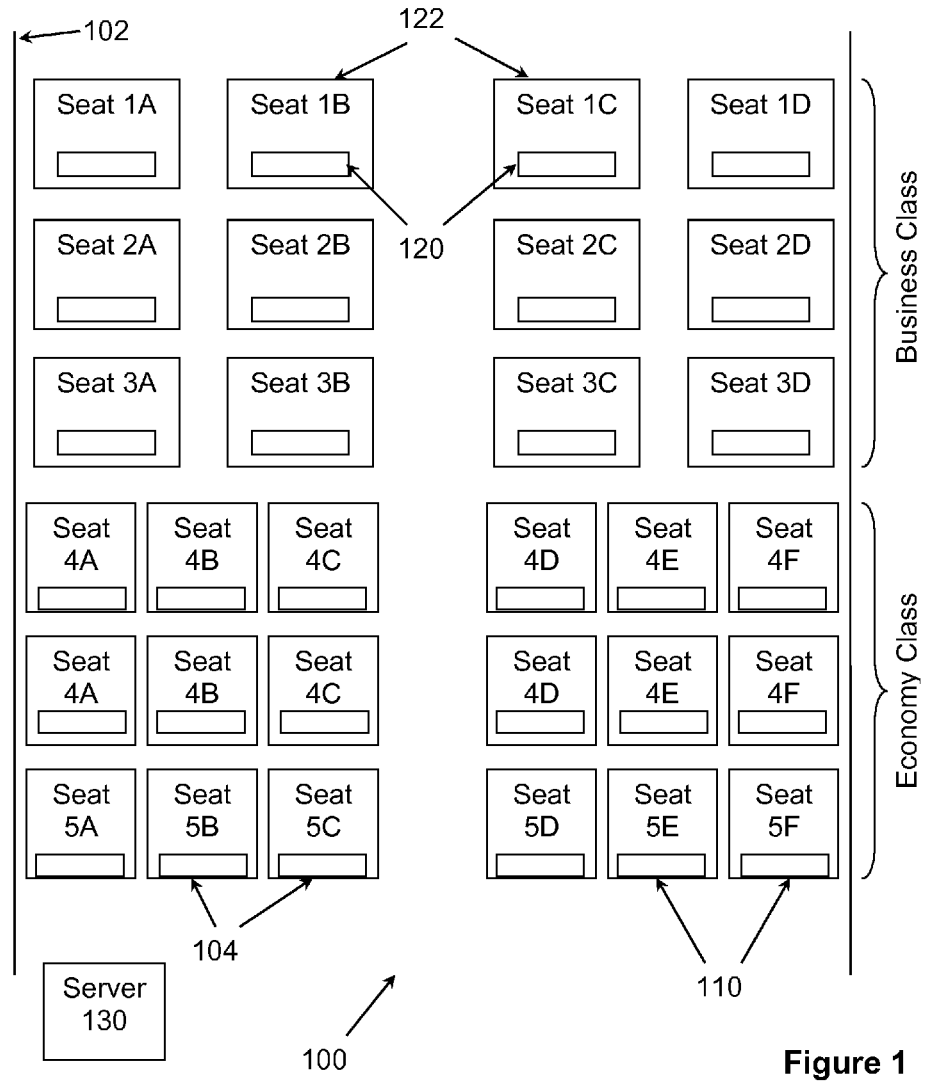
FIGS. 1-2 are schematics of various embodiments of a vehicular entertainment system.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the disclosed system represents an infrastructure for supplying redundant content within a vehicular entertainment system.

It should be noted that while the following description is drawn to a computer/server based vehicular entertainment system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including a reduction of the storage space required for each media player to store a full content set, a reduction of the time required to update a full content set across a plurality of media players, and an increased redundancy in the system to reduce the effect of non-functioning or otherwise unavailable media players.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In FIG. 1, an aircraft entertainment system 100 is shown having a plurality of media players 110 disposed within an aircraft 102. Although the following discussion concerns an aircraft including system 100, it is contemplated that the system 100 could be disposed in other vehicles including, for example, buses, trains and boats. Preferably, the media players 110 are stored in the backs of seats 104, although some or all of the media players 110 could be alternatively stored in arm rests or other portions of the seats 104, or in bulkheads, for example. The storage device(s) of the media players 110 can advantageously be field-replaceable to allow for quick replacement of a storage device while the aircraft 102 is in transit or parked. Alternatively, it is contemplated that the entire media player 110 could be field-replaceable.

The plurality of media players 110 can collectively store a full content set, preferably with each of the media players 110 storing only a fraction of the full content set. Thus, in one example, the full content set could be distributed across the plurality of media players 110 such that each media player stores a unique portion of the full content set. However, it is also contemplated that the plurality of media players 110 could collectively store multiple copies of the full content set with different media players storing the same or different portions of the full content set. For example, media players at seats 1A-1C may collectively store a copy of the full content set with a third of the content set being stored at each of seats 1A-1C. Alternatively, the full content set could be collectively stored across media players 110 in a column (e.g., seats 1A, 2A and 3A), or any other fraction and distribution across the plurality of media players 110.

Because each media player 110 stores less than the full content set, the media players 110 are each preferably configured to address or otherwise index the full content set by obtaining missing content over a wired and/or wireless network from others of the plurality of media players 110. For example, if the media player 100 at seat 1A requests content not stored at seat 1A, that media player might obtain the missing content from another of the media players 110 (e.g., seat 1C). Although it is preferred that each media players 110 obtains missing content from neighboring or adjacent media players 110, there may be situations where a media player 110 obtains content from non-adjacent or non-neighboring media player(s) 110, such as if the adjacent or neighboring media player(s) 110 lacks the requested content, is not functioning or is otherwise unavailable, and so forth.

It is contemplated that the full content set could include various types of media including, for example, images, games, audio files, and video files.

Rather than evenly distribute the full content set across the plurality of media players 110, it is especially preferred that the full content set is striped across the plurality of media players 110. In some contemplated embodiments, the full content set can be striped across media players 110 in a seat row or partial set thereof (e.g., seats 1A-1C, seats 1D-1F, seats 1A-1F, etc.). Alternatively, the full content set could be striped across media players 110 in a seat column or partial set thereof (e.g., seats 1A-2A, seats 1A-3A, etc.), or across diagonals, sections of the aircraft 102, or other desired groupings.

In other contemplated embodiments, the striping can vary among the classes of services, such as that on an airplane. For example, in first class, where there are fewer seats and media players, the full content set might be striped across an entire seat row, seat column, or other grouping of the media players 110, and in economy class, the full content set might be striped across a portion of a seat row, seat column, or other grouping of the media players 110. In another example, each of the classes of services could have different content sets, which could be striped in the same or a different manner than the other class(es) of service.

In still further contemplated embodiments, the full content set can be collectively stored across X media players of the plurality of media players 110, where X is at least two, and preferably, at least three. Preferably, in such embodiments, the X media players each stores an overlapping fraction of the full content set to thereby provide redundancy within the system 100. In this manner, should a media player become non-functional or otherwise unavailable, content stored on that media player could be accessed from another of the plurality of media players 110.

The specific fraction of the full content set stored in each of the plurality of media players 110 can be defined by a ratio of less than one, Y/X, where Y media players of the X media players in the plurality of media players 110 are required to form the full content set, and where Y is less than X. In some contemplated embodiments, the ratio Y/X is no greater than $3/5$, no greater than $2/5$, no greater than $1/3$, and no greater than $1/4$. However, the specific ratio Y/X can be adjusted as desired based on the vehicular seat configuration, the cost of storage space, the size of the full content set, the number of different content sets, the desired redundancy, or other factors.

It is also contemplated that the full content set could include different subsets of media, which can be striped differently from another subset of media of the full content set. For example, the full content set could include both free and pay-per-view content (i.e., 2 subsets), and each media player 110 could store a larger fraction (e.g., $3/5$) of the free content than the fraction (e.g., $1/3$) of the pay-per-view content stored by that media player. The specific fraction of each subset of content stored by each media players 110 could depend upon the projected or actual number of requests for such content on a periodic basis. Thus, for example, it is likely that the free content will be accessed more often than paid content, and for that reason, a larger fraction of the free content may be stored in each of the media players 110.

It is further contemplated that one subset of content could require Y media players to collectively store the first subset, and Z media players could be required to collectively store another subset, where Y is less than Z, which is less than X. The required Y and Z media players could be either an overlapping (e.g., $Y+Z>X$) or a non-overlapping set (e.g., $Y+Z \leq X$) of the plurality of media players X. Still further, the specific fraction of each subset of content stored at each media player 110 could be varied over time depending upon shifts in viewership behavior, the amount of total content, and content in each subset, the cost of storage space, and so forth.

In other contemplated embodiments, a second plurality of media players 120 can be disposed within a second plurality of seats 122 of the aircraft 102. The second plurality of media players 120 can collectively store a second full content set, with each of the media players 120 storing only a fraction of the second full content set. The second full content set could be collectively stored in a RAID array across W media players of the second plurality of media players 120, where W is at least two, and more preferably, at least three. In such embodiments, Z media players will typically be required to form the second full content set where Z is less than Y. Each of the media players 120 can be configured to index the second full content set based upon a seat-row addressing, seat-column addressing, or other indexing system.

It is preferred that the second set of seats 122 have a different size and dimension than the first set of seats 104 where the X media players 110 are disposed. Thus, for example, it is contemplated that seats 104 could be associated with an economy class while the second set of seats 122 could be associated with a higher class of service, such as premium economy, business or first class.

Each of the media players 110 can be communicatively coupled to others of the media players 110 and a headend server 130 via a wired or wireless connection. Although in some contemplated embodiments the media players 110 can be coupled via a wired connection, such connections can be disadvantageous as they can restrict where the media players 110 can be located. It is also contemplated that the aircraft 102 can include an in-vehicular wireless network communicatively coupling the plurality of media players 110 to each other. See, e.g., U.S. Pat. No. 7,103,324 to Sanford, et al. Such network may include multiple access points disposed in different regions of the aircraft 102 to ensure that each media player 110 can connect to other media players 110 accessible via the network. See, e.g., U.S. Pat. No. 7,620,364 to Higashida, et al.

Alternatively, the media players 110 of a seat column can be coupled via a wireless connection. For example, it is contemplated that media players of a seat row (e.g., seats 1A-1F) or a portion thereof (e.g., seats 1A-1C) could be coupled with each other via a wired connection and coupled to media players of another seat row (e.g., seats 2A-2C) via a wireless connection. In such embodiments, one or more of the media players 110 in each seat row could include a wireless client capable of connecting with one or more wireless access points (WAPs). See, e.g., EPO pat. publ. no. 1835662 to Takeuchi.

The aircraft 102 can further include at least one server 130 configured to store the full content set, and optionally, additional content sets if present. Each of the plurality of media players 110 can be communicatively coupled with the server 130 via a wired and/or wireless network, such that each media player's fractional set of the full content set can be retrieved and stored on the individual media players 110. Such connection could be direct or indirect, such as via another media player 110 or other component of system 100. In this manner, media players 110 could be reloaded as necessary using the full content set stored on the server 130. In addition, to update content stored on the plurality of media players 110, it is contemplated that the updated content can first be loaded on the server 130, and the updated content can then be distributed to the media players 110 according to a predetermined storage scheme, such as those discussed above.

Figure 2:
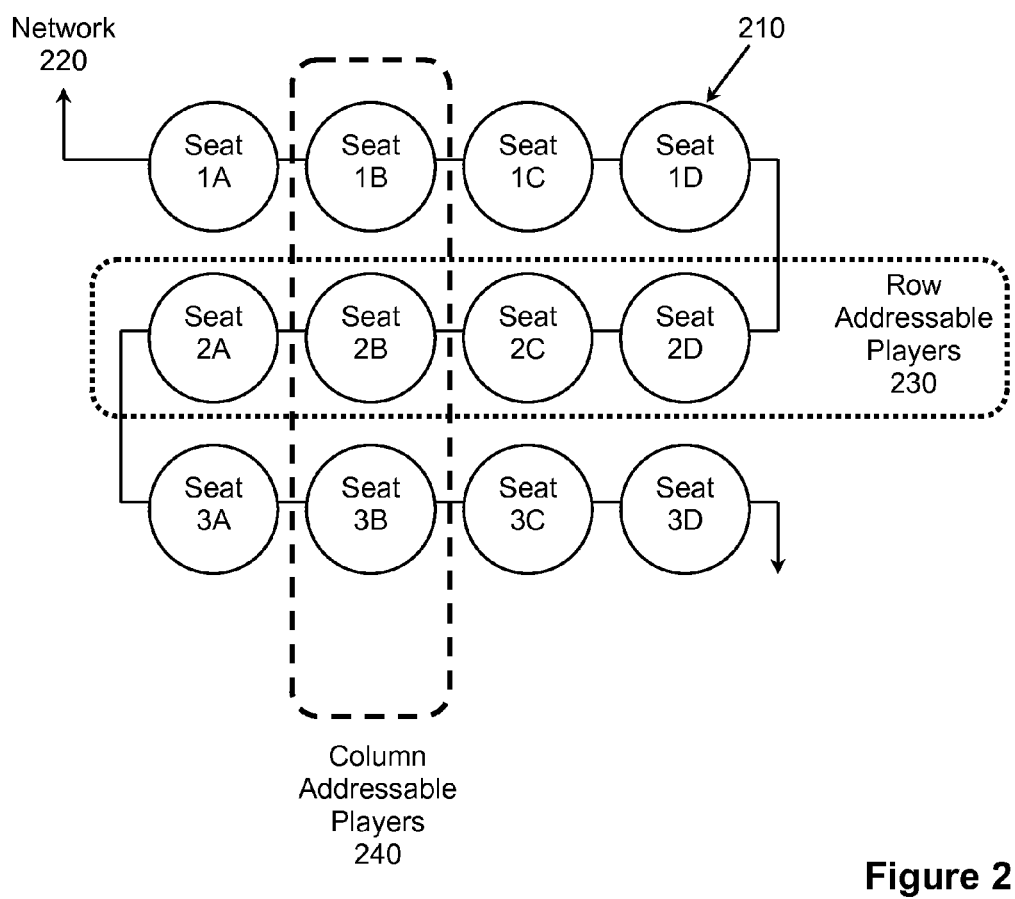

FIG. 2 illustrates a plurality of media players 210 arranged in a grid comprising rows and columns of seats. Instead of media players 210 at each seat containing a full content set, each media player could contain a fraction of the full content set (e.g., less than a whole). In the example shown, each media player 210 could contain ¼ of the content set, for example, although the specific distribution of the full content set across the media players can vary depending upon the arrangement and number of media players and seats, the cost of storage, the size of the full content set, the number of different content sets, the desired redundancy, or other factors.

Thus, for example, media players 210 in seats 1A through 1D would collectively contain a full content set, as would seats 2A-2D and seats 3A-3D, and so forth. If passenger in seat 1A requested to access content that was not stored at media player 210 in seat 1A but was stored on the media player 210 of seat 1B, the media player 210 in seat 1A can query the media player 210 in seat 1B for the desired content. The desired content could then be obtained over a network 220 in real time. As shown in FIG. 2, the content can be striped across seat rows or can otherwise be seat-row addressable via row addressable players 230.

By striping content across media players 210, a further layer of redundancy can be introduced. Should a media player 210 fail in a seat row, missing content can be obtained from a media player of another seat row. For example, if the media player 210 in seat 1B fails to provide content, the missing content could be obtained from the media player 210 in seat 2B or 3B. Thus, fractions of the content set can be mirrored across seats in columns or can otherwise be seat-column addressable via column addressable players 240.

Figure 3:
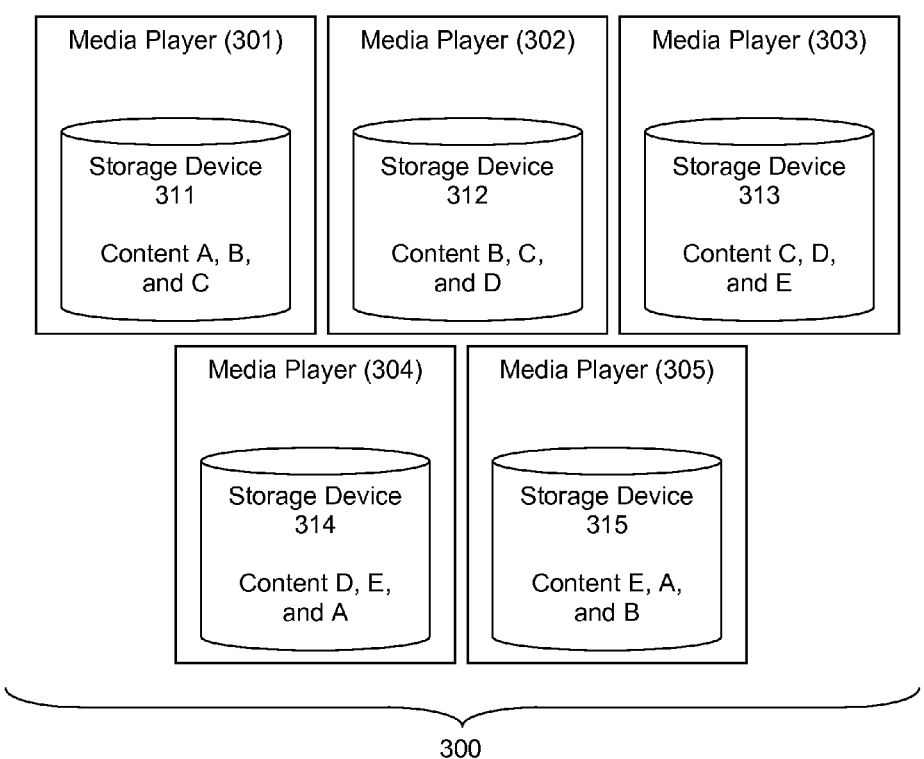
FIG. 3 is a schematic of a distribution scheme of a full content set across a plurality of media players.

FIG. 3 illustrates another example where a set 300 of media players 301-305 collectively store a full content set (i.e., A, B, C, D, and E). Each of the media players 301-305 in the set 300 stores ⅗ of the content. In the example, up to two of the media players 301-305 in the set 300 could fail while the remaining media players 301-305 can provide the missing content.

Figure 4:
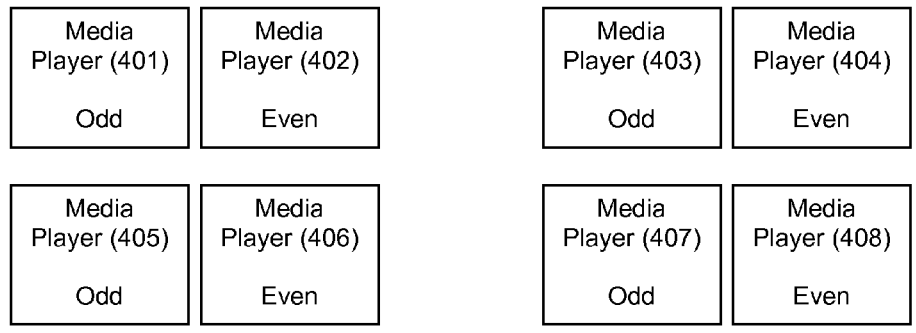
FIGS. 4-5 are schematics of various groupings of media players in a vehicular entertainment system.

In FIG. 4, an entertainment system 400 is shown having a plurality of media players 401-408. Typically, a downtime is associated with an IFE and other entertainment systems when previous content is removed and new content is loaded on the media players 401-408. For example, this downtime might be based upon a load rate of 10 GB per hour, which could equate to a downtime of days to fully load the content on the media players 401-408.

To reduce the downtime that can occur when new content must be loaded on the media players 401-408, it is contemplated that a defined portion of the media players 401-408 can collectively store a full content set. For example, a first full content set (e.g., month 1's content) could be collectively stored on half of the media players 401-408, while a second full content set (e.g., month 2's content) could be collectively stored on the other half of the media players 401-408. In this manner, no more than 50% of the total volume of content storage of the media players 401-408 is changed at each cycle. This advantageously can eliminate downtime associated with loading new content, as the new content can be distributed among a portion of the media players while the previous content is still stored and accessible from the others of the media players.

As shown in FIG. 4, the media players 401-408 can be divided into "odd" and "even" groups, where the odd group 401, 403, 405, and 407 collectively store a first content set, and the even group 402, 404, 406, and 408 collectively store a second content set. Where new content is loaded each month, the odd group could represent content for odd-numbered months (e.g., January, March, etc.) and the even group could represent content for even-numbered months (e.g., February, April, etc.). In such embodiment, for example, during an even-numbered month, the even group of media players 402, 404, 406, and 408 can each contain the second full content set, or a portion thereof. Media players of the odd group 401, 403, 405, and 407 can access that month's content from one or more of the even group of media players 402, 404, 406, and 408. Toward the end of the even month, the next month's full content set could be striped or otherwise loaded on the odd group of media players 401, 403, 405, and 407. After the full content set has been distributed among the odd group of media players 401, 403, 405, and 407, the newly loaded content could then be accessed from the media players 401-408.

Figure 5:
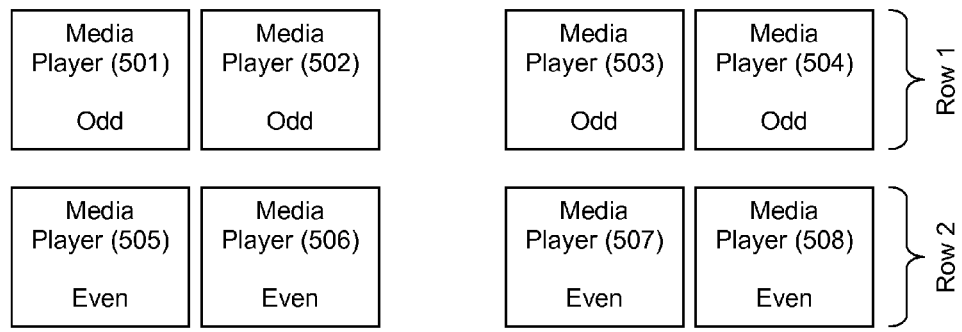

In an alternative embodiment, FIG. 5 illustrates an entertainment system 500 having a plurality of media players 501-508, which are divided into "odd" and "even" groups by seat row. The odd group 501-504 (row 1) can collectively store a first content set, and the even group 505-508 (row 2) can collectively store a second content set. Of course, the media players could be divided into groups along seat-columns or other suitable groupings, such that a portion of the media players store a full content set or portion thereof that is different from the full content set or portion thereof stored by the other portion of the media players.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein.

The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A vehicular entertainment system, comprising:
a first plurality of media players disposed within a vehicle that collectively store multiple copies of a first full content set spread across the first plurality of media players, each of the media players storing only a fraction of the first full content set;
and a second plurality of media players disposed within the vehicle that collectively store multiple copies of a second full content set spread across the plurality of second media players, each of the second media players storing only a fraction of the second full content set;
and wherein each of the media players in the first plurality of media players and the second plurality of media players is configured to:
index the first full content set collectively stored by the first plurality of media players according to a first scheduled period, to allow each of the media players to obtain content from the first full content set during the first scheduled period;
and index the second full content set collectively stored by the second plurality of media players according to a second scheduled period, to allow each of the media players to obtain content from the second full content set during the second scheduled period, wherein the first scheduled period comprises a first month long period and the second scheduled period comprises a second month-long period and wherein the first scheduled period and the second scheduled period are mutually exclusive.

2. The system of claim 1, wherein the first plurality of media players are disposed within at least one of seatbacks, seat arms, and bulkheads of the vehicle.

3. The system of claim 2, wherein the first full content set is striped across media players in a seat group.

4. The system of claim 3, wherein the seat group comprises a set of media players in a seat row.

5. The system of claim 2, wherein the first plurality of media players are each configured to provide their fraction of the first full content set to other media players lacking the content based on seat-row addressing.

6. The system of claim 2, wherein the first plurality of media players are each configured to provide their fraction of the first full content set to other media players lacking the content based on seat-column addressing.

7. The system of claim 6, wherein fractions of the first full content set are mirrored across media players in seat columns.

8. The system of claim 6, wherein the media players of a seat column are coupled via a wireless connection.

9. The system of claim 1, wherein at least two of the media players collectively comprise the first full content set.

10. The system of claim 1, wherein the first full content set is collectively stored across X media players in a RAID array, where X is at least three.

11. The system of claim 10, wherein the first full content set comprises first and second subsets, and wherein Y media players are required to form the first subset and Z media players are required to form the second subset, and wherein Y is less than Z, which is less than X.

12. The system of claim 10, wherein the X media players each comprise overlapping fractions of the first full content set.

13. The system of claim 10, wherein Y media players are required to form the first full content set, and wherein Y is less than X.

14. The system of claim 13, wherein the ratio of Y/X is no greater than ⅓.

15. The system of claim 13, further comprising:
a second plurality of media players disposed within a second plurality of seatbacks of the vehicle that collectively store a second full content set, each of the second plurality of media players storing only a fraction of the second full content set, and wherein each of the second plurality of media players is configured to index the full content set;
wherein the X media players are disposed in a first set of seatbacks of the vehicle having a different size and dimension than the second set of seatbacks; and
wherein the second full content set is collectively stored in a RAID array across W media players of the second plurality of media players, where W is at least three, and wherein Z media players are required to form the second full content set, where Z is less than Y.

16. The system of claim 1, further comprising an in-vehicular wireless network communicatively coupling the first plurality of the media players to each other.

17. The system of claim 1, wherein the storage device of each player is field replaceable.

18. A vehicular entertainment system, comprising:
a plurality of media players disposed within a vehicle that collectively store multiple copies of a full content set spread across the plurality of media players, wherein the plurality of media players comprises first and second subsets of media players;
wherein the first subset of media players collectively stores a first copy of the full content set with each media player of the first subset stores only a fraction of the first copy of the full content set;
wherein the second subset of media players collectively stores a second copy of the full content set with each media player of the second subset stores only a fraction of the second copy of the full content set;
and wherein each of the media players of the first and second subsets is configured to index the first and second copies of the full content set collectively stored by the media players of the first and second subsets according to a first scheduled period and a second scheduled period, respectively, wherein the first scheduled period comprises a first month-long period and the second scheduled period comprises a second month-long period and wherein the first scheduled period and the second scheduled period are mutually exclusive.

* * * * *